(12) United States Patent  
Sebal et al.

(10) Patent No.: US 11,597,149 B2  
(45) Date of Patent: Mar. 7, 2023

(54) DEVICE FOR METERING ONE OR MORE POWDERS, CORRESPONDING METERING PROCESS AND 3D PRINTER THAT INCLUDES THE DEVICE

(71) Applicant: AddUp, Cebazat (FR)

(72) Inventors: Jean-Luc Sebal, Montvalent (FR); Guillaume Cadoux, Gagnac sur Cere (FR)

(73) Assignee: ADDUP, Cebazat (FR)

( * ) Notice: Subject to any disclaimer, the term of this patent is extended or adjusted under 35 U.S.C. 154(b) by 290 days.

(21) Appl. No.: 16/651,555

(22) PCT Filed: Sep. 27, 2018

(86) PCT No.: PCT/EP2018/076340  
§ 371 (c)(1),  
(2) Date: Mar. 27, 2020

(87) PCT Pub. No.: WO2019/063728  
PCT Pub. Date: Apr. 4, 2019

(65) Prior Publication Data  
US 2020/0262148 A1  Aug. 20, 2020

(30) Foreign Application Priority Data  
Sep. 29, 2017  (FR) ..................................... 1759070

(51) Int. Cl.  
*B29C 64/357* (2017.01)  
*B29C 64/343* (2017.01)  
(Continued)

(52) U.S. Cl.  
CPC .......... *B29C 64/343* (2017.08); *B05B 7/1468* (2013.01); *B05B 12/1418* (2013.01);  
(Continued)

(58) Field of Classification Search  
CPC ... B05B 7/1468; B05B 12/1418; B22F 12/57; B22F 12/55; B22F 12/53; B29C 64/357; G05D 11/132  
See application file for complete search history.

(56) References Cited

U.S. PATENT DOCUMENTS 8,901,453 B2 * 12/2014 Miyagi ................ B23K 26/144  
219/121.84  
10,226,917 B2   3/2019 Hyatt et al.  
(Continued)

FOREIGN PATENT DOCUMENTS

EP     2 463 052 A1    6/2012  
WO  2017/019769 A1    2/2017

OTHER PUBLICATIONS

International Search Report dated Nov. 19, 2018, in corresponding PCT/EP2018/076340 (4 pages).

*Primary Examiner* — Timothy Kennedy  
*Assistant Examiner* — Farah Taufiq  
(74) *Attorney, Agent, or Firm* — Venable LLP (57) ABSTRACT

A device for metering one or more powder(s) (A, B) to produce a flow (23) of powder(s) and of a carrier gas at a given volume flow rate, comprises: •at least a first source (25) suitable for supplying a first flow (27) comprising a first powder (A) and a first carrier gas (G1) substantially at the given volume flow rate, •a source (33) of a carrier gas suitable for supplying an adjustment carrier gas flow (35) substantially at the given volume flow rate, •an outlet junction (49) for emitting said flow of powder(s) and of carrier gas, •a first proportional valve (59), •an adjustment proportional valve (75), and •a control system (21) suitable for controlling at least the first proportional valve and the adjustment proportional valve so that the flow of powder(s)

(Continued)

and of carrier gas has a volume flow rate substantially equal to the given volume flow rate.

8 Claims, 6 Drawing Sheets

(51) Int. Cl.
| | |
|---|---|
| *B33Y 40/00* | (2020.01) |
| *B29C 64/209* | (2017.01) |
| *B29C 64/393* | (2017.01) |
| *B22F 12/57* | (2021.01) |
| *B22F 12/53* | (2021.01) |
| *B22F 12/70* | (2021.01) |
| *B05B 7/14* | (2006.01) |
| *B05B 12/14* | (2006.01) |
| *B22F 12/55* | (2021.01) |
| *B33Y 10/00* | (2015.01) |
| *B33Y 30/00* | (2015.01) |
| *B33Y 50/02* | (2015.01) |
| *B29C 64/153* | (2017.01) |
| *B29C 64/268* | (2017.01) |

(52) U.S. Cl.
CPC .............. *B22F 12/53* (2021.01); *B22F 12/55* (2021.01); *B22F 12/57* (2021.01); *B22F 12/70* (2021.01); *B29C 64/209* (2017.08); *B29C 64/357* (2017.08); *B29C 64/393* (2017.08); *B33Y 40/00* (2014.12); *B29C 64/153* (2017.08); *B29C 64/268* (2017.08); *B33Y 10/00* (2014.12); *B33Y 30/00* (2014.12); *B33Y 50/02* (2014.12)

(56) References Cited

U.S. PATENT DOCUMENTS

| | | |
|---|---|---|
| 2012/0145683 A1 | 6/2012 | Miyagi et al. |
| 2017/0028631 A1 | 2/2017 | Hyatt et al. |
| 2020/0164467 A1 | 5/2020 | Cadoux et al. |

\* cited by examiner

DEVICE FOR METERING ONE OR MORE POWDERS, CORRESPONDING METERING PROCESS AND 3D PRINTER THAT INCLUDES THE DEVICE

BACKGROUND

The invention concerns a device for metering one or more powders for producing a flow of powder(s) and a carrier gas for a 3D printing installation spraying at least a first powder, as well as a 3D printer integrating such a device and a process employing that device.

The invention concerns for example the field of fast manufacture and repair of three-dimensional metal parts directly from computer-aided design. The processes of additive construction, resurfacing by spraying metal powder(s) and laser metal deposition (LMD) consist in melting one or more metal powder(s) with the aid of a laser beam in order to generate a deposit with perfectly controlled dimensions. The layers of material are stacked successively to create functional technical parts. This 3D printing method of manufacture can be used in numerous technical fields from the automotive field to the aerospace field.

At present LMD technologies enable saving of material compared to classic machining, in which the removal of material can reach up to 80% of the finished part. Given the cost of the metals employed in industry, industrialists are looking for techniques making it possible to reduce the consumption of material. Thus additive manufacture users attempt to reduce the quantity of powder(s) used, whilst preserving the mechanical properties of the parts produced.

Current powder metering devices are generally situated outside the enclosure of the 3D printing machine for reasons of overall size, filling and maintenance. They distribute powder continuously to one or more injection nozzles via a flexible tube. The injection nozzle guides the power toward the laser beam. The powder is generally transported in a flow of carrier gas, for example argon, to enable its movement.

At present, the relatively long distance between the metering device and the nozzle or nozzles induces a long response time between starting up and the arrival of the powder, approximating ten seconds. This response time is harmful to the development of this technology as it makes it impossible to stop the flow of powder, to change the type of powder instantaneously, or even to modulate the flow rate of powder.

An object of the present invention is therefore to alleviate some or all of the aforementioned disadvantages, that is to say in particular to provide a device for metering one or more powders enabling production of parts with graded properties.

SUMMARY

To this end, the invention consists in a device for metering one or more powders in order to produce a flow of powder(s) and of a carrier gas at a given volume flow rate, the device comprising:
- at least a first source adapted to supply a first flow including a first powder and a first carrier gas at a volume flow rate substantially equal to the given volume flow rate,
- a source of a carrier gas adapted to supply an adjustment carrier gas flow at a volume flow rate substantially equal to the given volume flow rate,
- an outlet junction for sending said flow of powder(s) and of carrier gas,
- at least a first proportional valve including an inlet connected to the first source to receive the first flow, a first outlet for selectively sending a volume percentage X1 of the first flow to the outlet junction, and a second outlet adapted to send a volume percentage 100−X1 of the first flow, the percentage X1 being between 0% and 100% inclusive and representative of a setting of the first proportional valve,
- an adjustment proportional valve including an inlet connected to said source of carrier gas by a first connecting line to receive at least a fraction of the adjustment carrier gas flow, a first outlet adapted to send a volume percentage Y of said fraction, and a second outlet adapted to send a volume percentage 100−Y of said fraction, the percentage Y being between 0% and 100% inclusive and representative of a setting of the adjustment proportional valve, and
- a control system adapted to control at least the first proportional valve and the adjustment proportional valve and configured so that the flow of powder(s) and of carrier gas has a volume flow rate substantially equal to the given volume flow rate.

In accordance with particular embodiments, the device has one or more of the following features, separately or in all technically possible combinations:
- the device further includes at least a first recycling system for recycling at least a part of the first flow, and at least a first recycling junction connected, upstream, to the second outlet of the first proportional valve to receive the percentage 1−X1 of the first flow and to the first outlet of the adjustment proportional valve to receive the percentage Y of said fraction and, downstream, to an inlet of the first recycling system, the control system being configured so that the inlet of the first recycling system receives a volume flow rate substantially equal to the given volume flow rate;
- the device includes an aspiration and filtration system connected to an outlet of the first recycling system and a member for regulating a head loss between the first recycling system and the aspiration and filtration system, the regulator member being adapted so that a pressure in the outlet junction and a pressure in the first recycling junction are substantially equal to one another;
- the first proportional valve and the adjustment proportional valve each include an internal diffuser and a switch mobile in rotation relative to the diffuser, respectively to divide the first flow into the percentage X1 and the percentage 100−X1, and the fraction of the adjustment carrier gas flow into the percentage Y and the percentage 100−Y;
- the outlet junction is moreover connected to the second outlet of the adjustment proportional valve to receive the volume percentage of said fraction, the device being configured so that the percentage X1 and the percentage Y are substantially equal to one another and said fraction is equal to 100%;
- the device further includes: a second source adapted to supply a second flow including a second powder distinct from the first powder and a carrier gas at a volume flow rate substantially equal to the given volume flow rate and a second proportional valve including an inlet connected to the second source to receive the second flow, a first outlet adapted selectively to send a volume percentage X2 of the second flow to the outlet junction and a second outlet (adapted to send a volume percentage 100−X2 of the second flow, the percentage X2 being between 0% and 100% inclusive and representative of a setting of the second proportional valve, the control system being further adapted to control the second proportional valve;

the device further includes: a second recycling system for recycling at least a part of the second stream and a second recycling junction connected, upstream, to the second outlet of the second proportional valve to receive the percentage 100−X2 of the second flow and to the second outlet of the proportional adjustment valve to receive the proportion Y of said fraction and, downstream, to an inlet of the second recycling system, the control system being configured so that the inlet of the second recycling system receives a volume flow rate substantially equal to the given volume flow rate;

the control system is configured so that the percentage Y is substantially equal to the sum of the percentages X1 and X2 and said fraction is equal to 100%; and the device includes a second line connecting the first connecting line to the outlet junction to deliver to the outlet junction a fraction of the adjustment carrier gas flow.

The invention also concerns a 3D printer spraying one or more powders, including a device as described hereinabove and at least one nozzle for ejecting said flow of powder(s) and carrier gas.

The invention also concerns a method of metering one or more powder(s) for producing a flow of powder(s) and a carrier gas at a given volume flow rate, the method including at least the following steps:

obtaining from a first source a first flow including a first power and a first carrier gas at a volume flow rate substantially equal to the given volume flow rate, obtaining from a source of a carrier gas a flow of adjustment carrier gas at a volume flow rate substantially equal to the given volume flow rate, sending said flow of powder(s) and vector gas from an outlet junction, receiving the first flow via the inlet of a first proportional valve, sending a volume percentage X1 of the first flow to the outlet junction via a first outlet of the first proportional valve, sending a volume percentage 100−X1 of the first flow via a second outlet of the first proportional valve, the percentage X1 being between 0% and 100% inclusive and obtained by adjusting the first proportional valve, receiving at least a fraction of the adjustment carrier gas flow via an inlet of an adjustment proportional valve, said inlet being connected to the carrier gas source via a first connecting line, sending a percentage Y of said fraction of the adjustment carrier gas via a first outlet of the adjustment proportional valve, sending a percentage 100−Y of said fraction via a second outlet of the adjustment proportional valve, the percentage Y being between 0% and 100% inclusive and obtained by adjustment of the adjustment proportional valve, and controlling at least the first proportional valve and the adjustment proportional valve by means of a control system configured so that the flow of powder(s) and vector gas has a volume flow rate substantially equal to the given volume flow rate.

BRIEF DESCRIPTION OF THE FIGURES

The invention finally concerns a 3D printing method integrating a metering method as described hereinabove.

The invention will be better understood on reading the following description, given by way of example only and referring to the appended drawings, in which.

DETAILED DESCRIPTION

There is described with reference to FIG. 1 a 3D printer 1 according to a first embodiment of the invention. In the example, the printer 1 is adapted to manufacture an object 3 from two powders A and B.

The printer 1 includes a laser source 5 for creating a laser beam 7 and a focusing system 9 for focusing the laser beam onto the object 3. The printer 1 further includes a device 11 for metering the powders A and B and a printhead 13 including a nozzle 15 for spraying a flow of the powders A and B and a carrier gas G. The printer 1 also includes a machine base 17 adapted to support the object 3 and to be moved for example in two horizontal and mutually perpendicular directions X, Y and an actuator 19 adapted to move the printhead 13 relative to the machine base 17 in a direction Z perpendicular to the directions X, Y. The printer 1 includes a control system 21 that is part of the metering device 11.

In the example represented, the focusing system 9 is situated in the printhead 13.

The machine base 17 and the actuator 19 are adapted to produce movement of the object 3 relative to the flow of powders A and B and to the laser beam 7.

In accordance with variants that are not represented, other relative movement means are employed, in particular to obtain movements in rotation of the object relative to the flows of powders A and B and/or to the laser beam 7.

The powders A and B are advantageously diverse metal powders, such as: steels and stainless steels, metal alloys, for example based on nickel, cobalt, titanium, copper or aluminium, ceramics, intermetallic compounds, and also polymers or other composite materials. The powders may be used separately or in distinct layers for the manufacture of complete parts, the repair of worn parts or the surface coating of parts, for example metal parts. The nature of the powders used varies according to the required characteristics and the use of the object 3 to be manufactured so that, in a variant that is not represented, the printer 1 includes a plurality of powder metering devices analogous to the device 11. This enables more combinations of powders to be offered on the same 3D printer and also ensures continuity of use during maintenance operations on the device 11.

Figure 2:
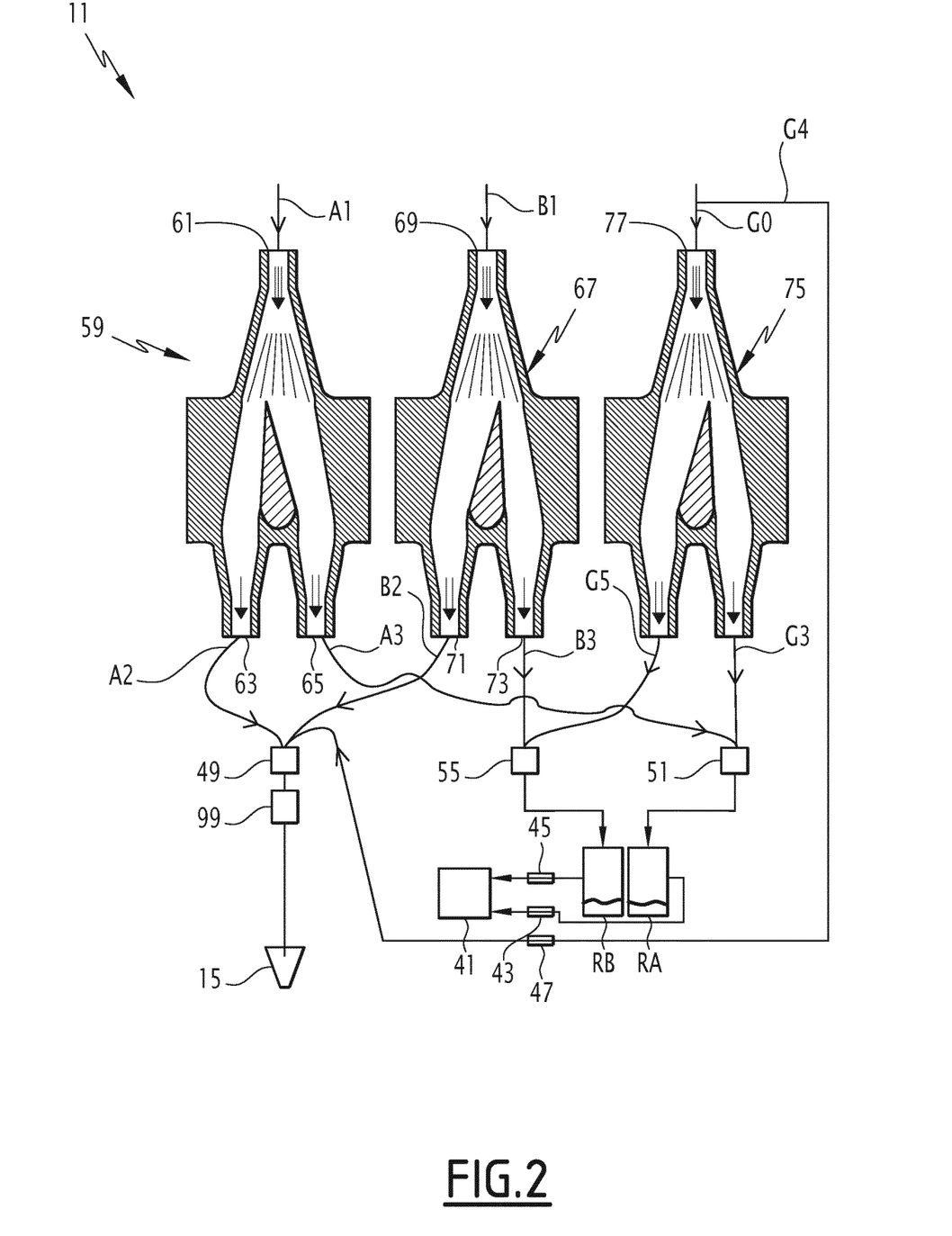
FIG. 2 is a diagrammatic representation of a metering device represented in FIG. 1 for metering two powders.
Figure 3:
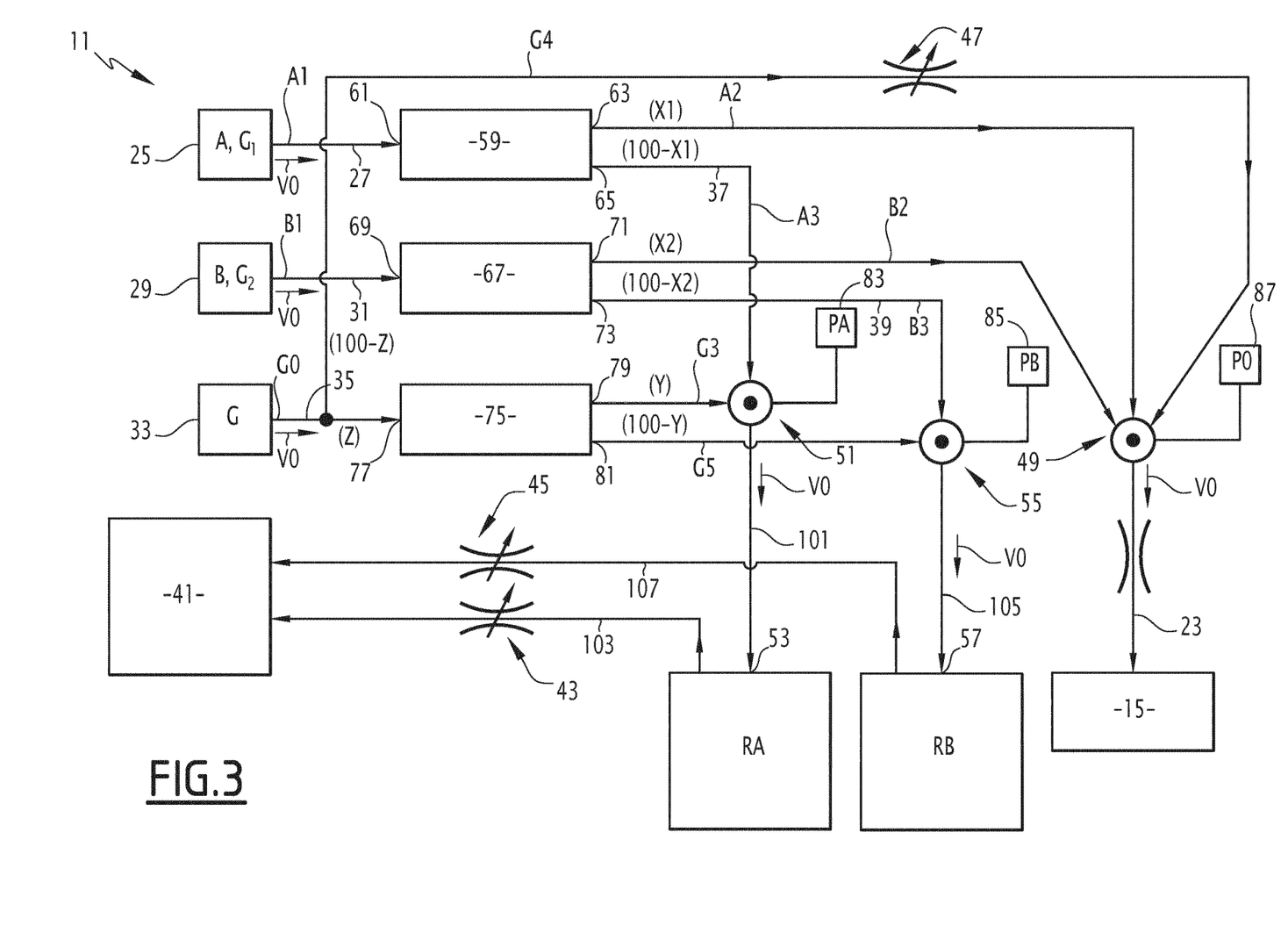
FIG. 3 is another diagrammatic representation of the metering device represented in FIGS. 1 and 2.

Referring to FIGS. 2 and 3, the device 11 is adapted to produce a flow 23 of powders A and B and of the carrier gas G at a given volume flow rate V0 symbolized by arrows in FIG. 3.

The device 11 includes a first source 25 adapted to supply a first flow 27 including the first powder A and a first carrier gas G1 at a volume flow rate substantially equal to the given volume flow rate V0, a second source 29 adapted to supply a second flow 31 including the second powder B and a second carrier gas G2 at a volume flow rate substantially equal to the given volume flow rate V0, and a source 33 of the carrier gas G adapted to supply a flow of adjustment carrier gas 35 also at a volume flow rate substantially equal to the given volume flow rate V0.

The device 11 advantageously includes a first recycling system RA adapted to recycle at least a part 37 of the first flow 27 and a second recycling system RB adapted to recycle at least a part 39 of the second flow 31.

The device 11 advantageously includes an aspiration and filtration system 41 and regulator members 43, 45, 47 for regulating various head losses.

The device 11 includes an outlet junction 49 for sending the flow 23 of powders and carrier gas, a first recycling junction 51 connected, downstream, to an inlet 53 of the first recycling system RA and a second recycling junction 55 connected, downstream, to an inlet 57 of the second recycling system RB.

The device 11 also includes a first proportional valve 59 including an inlet 61 connected to the first source 25 via a line A1 to receive the first flow 27, a first outlet 63 for selectively sending a volume percentage X1 of the first flow 27 to the outlet junction 49 via a line A2 and a second outlet 65 adapted to send a volume percentage 100−X1 of the first flow 27 via a line A3 to the first recycling junction 51.

The device 11 also includes, in an analogous manner, a second proportional valve 67 including an inlet 69 connected to the second source 29 via a line B1 to receive the second flow 31, a first outlet 71 adapted selectively to send a volume percentage X2 of the second flow 31 to the outlet junction 49 via a line B2 and a second outlet 73 adapted to send a volume percentage 100−X2 of the second flow 31 to the second recycling junction 55 via a line B3.

The device 11 also includes an adjustment proportional valve 75 including an inlet 77 connected to the carrier gas source 33 via a first connecting line G0 to receive a fraction of the flow of adjustment carrier gas 35, a first outlet 79 adapted to send a volume percentage Y of that fraction to the first recycling junction 51 via a line G3, and a second outlet 81 adapted to send a volume percentage 100−Y of said fraction to the second recycling junction 55 via a line G5.

In the example represented, a second connecting line G4 branches from the first connecting line G0 to deliver to the outlet junction 49 the remaining fraction of the adjustment carrier gas flow 35.

The carrier gases G, G1, G2 are advantageously of the same kind, and are for example argon.

The given volume flow rate V0 is advantageously between 0.5 and 100 l/min inclusive, preferably between 1 and 10 l/min inclusive. For example V0 has the approximately value 3 l/min (where "l" means "litre").

The regulator member 43 is situated between the first recycling system RA and the aspiration and filtration system 41 to regulate a pressure PA in the first recycling junction 51 measured by a pressure switch 83.

The regulator member 45 is situated between the second recycling system RB and the aspiration and filtration system 41 to regulate a pressure PB in the second recycling junction 55 measured with the aid of a pressure switch 85.

The regulator member 47 is situated in the second connecting line G4 and enables adjustment of a volume percentage Z of the adjustment carrier gas flow 35 arriving at the inlet 77 of the adjustment proportional valve 75 and a volume percentage 100−Z of the adjustment carrier gas flow taking the second connecting line G4 to the outlet junction 49.

The volume percentages X1, X2 and Y are respectively representative of settings of the first proportional valve 59, the second proportional valve 67 and the adjustment proportional valve 75. The percentages X1, X2 and Y may advantageously vary from 0% to 100% inclusive.

The regulator members 43, 45, 47 are adapted so that an outlet pressure P0 in the outlet junction 49, the pressure PA in the first recycling junction 51 and the pressure PB in the second recycling junction 55 are substantially equal to one another.

By "substantially equal" is meant here, for example, that they differ from one another by less than 5%, in order to guarantee the absence of back pressure on one or more recycling lines that could compromise the proportional operation of the powder metering proportional valves.

The regulator members 43, 45, 47 are for example valves.

The control system 21 is adapted to control the first proportional valve 59, the second proportional valve 67, the adjustment proportional valve 75 and, advantageously, the regulator member 47 so that the flow 23 of powders and of carrier gas has a volume flow rate substantially equal to the given volume flow rate V0.

A pressure switch 87 is used to measure the outlet pressure P0 in the outlet junction 49.

The first proportional valve 59, the second proportional valve 67 and the adjustment proportional valve 75 are advantageously structurally analogous to one another. Also, only the first proportional valve 59 will be described hereinafter.

Figure 4:
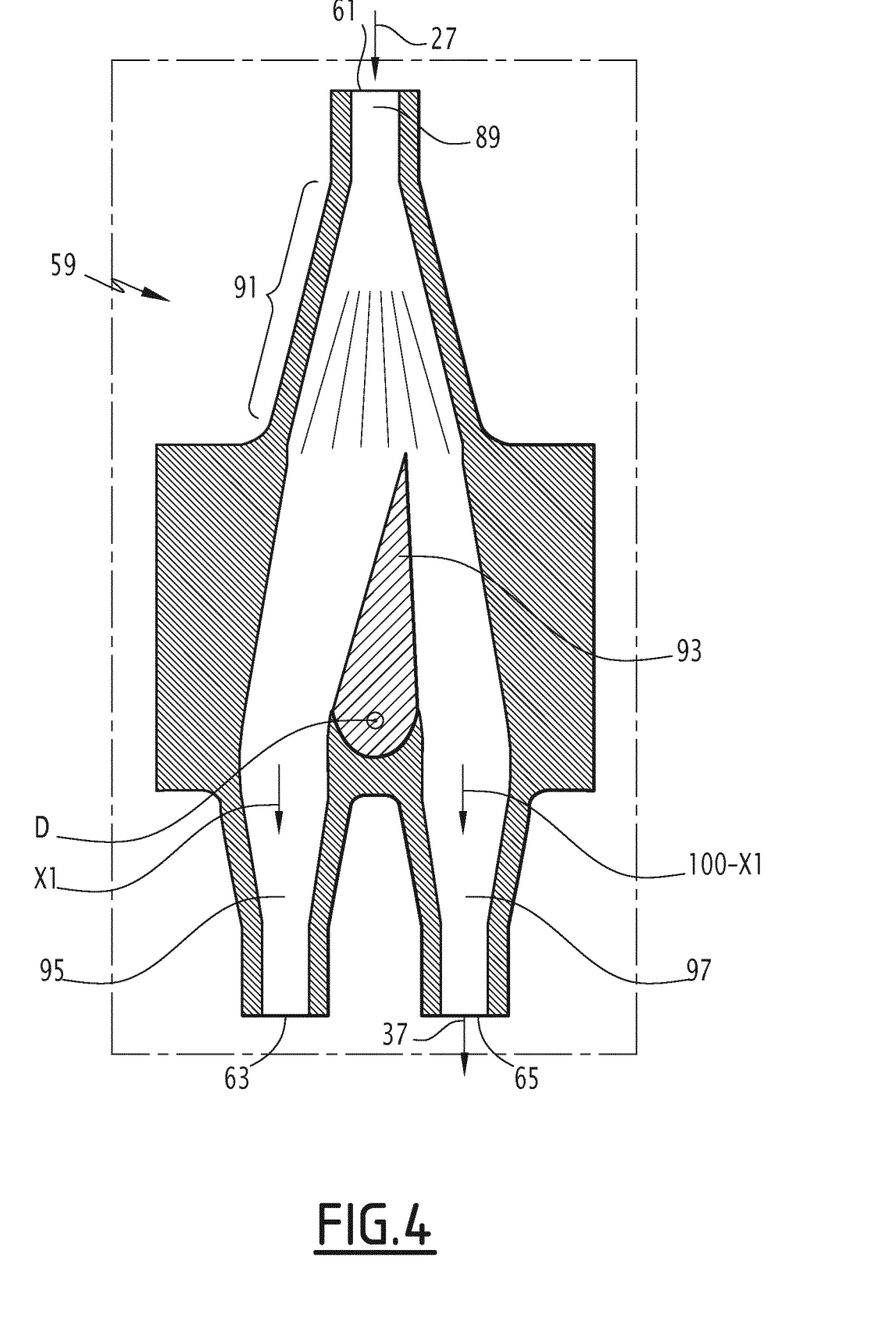
FIG. 4 is a more detailed representation in section of any one of the proportional valves of the metering device represented in FIGS. 1 to 3.

As can be seen in FIG. 4, the first proportional valve 59 includes an inlet line 89 forming the inlet 61 connected to the first source 25, an internal diffuser 91 adapted to produce a homogeneous distribution of the first flow 27, a switch 93 mounted to be mobile in rotation relative to the diffuser about an axis D in such a manner as to separate the first flow 27 into, on the one hand, the volume percentage X1 and, on the other hand, the percentage 100−X1 respectively in two circulation streams 95, 97 respectively defining the first outlet 63 and the second outlet 65.

Accordingly, to an angular position of the switch 93 about the axis D relative to the diffuser 91 there corresponds a value of the percentage X1 representative of the setting of the first proportional valve 59.

Figure 5:
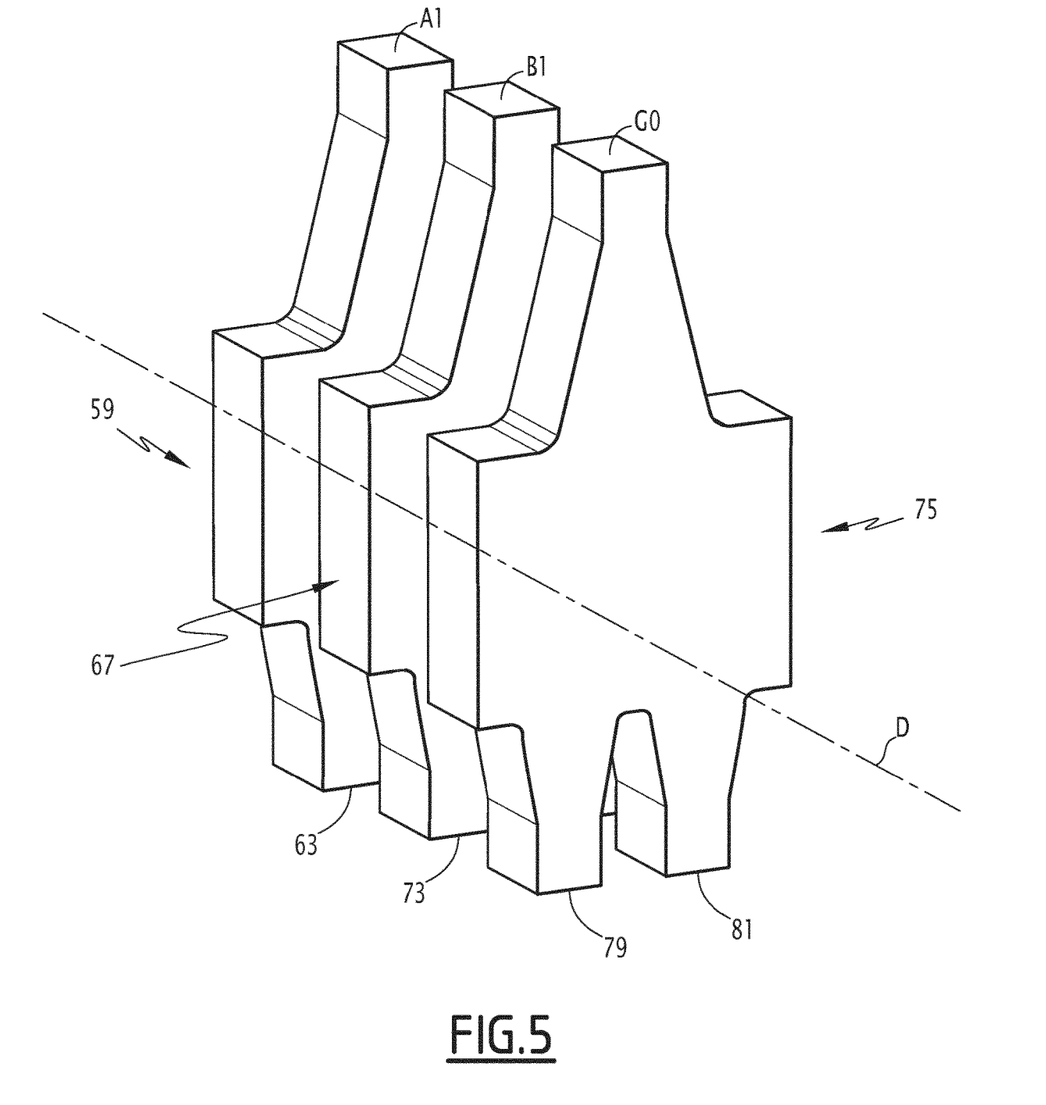
FIG. 5 is a perspective view of an arrangement of three proportional valves of the metering device represented in FIGS. 1 to 3.

In accordance with one particular embodiment represented in FIG. 5, the first proportional valve 59, the second proportional valve 67 and the adjustment proportional valve 75 are disposed side by side so as to render the movements of the switches 93 coaxial. This enables mechanical coupling of two of the switches 93 to one another, the benefit of which will be specified later.

The operation of the 3D printer 1 will now be described.

Figure 1:
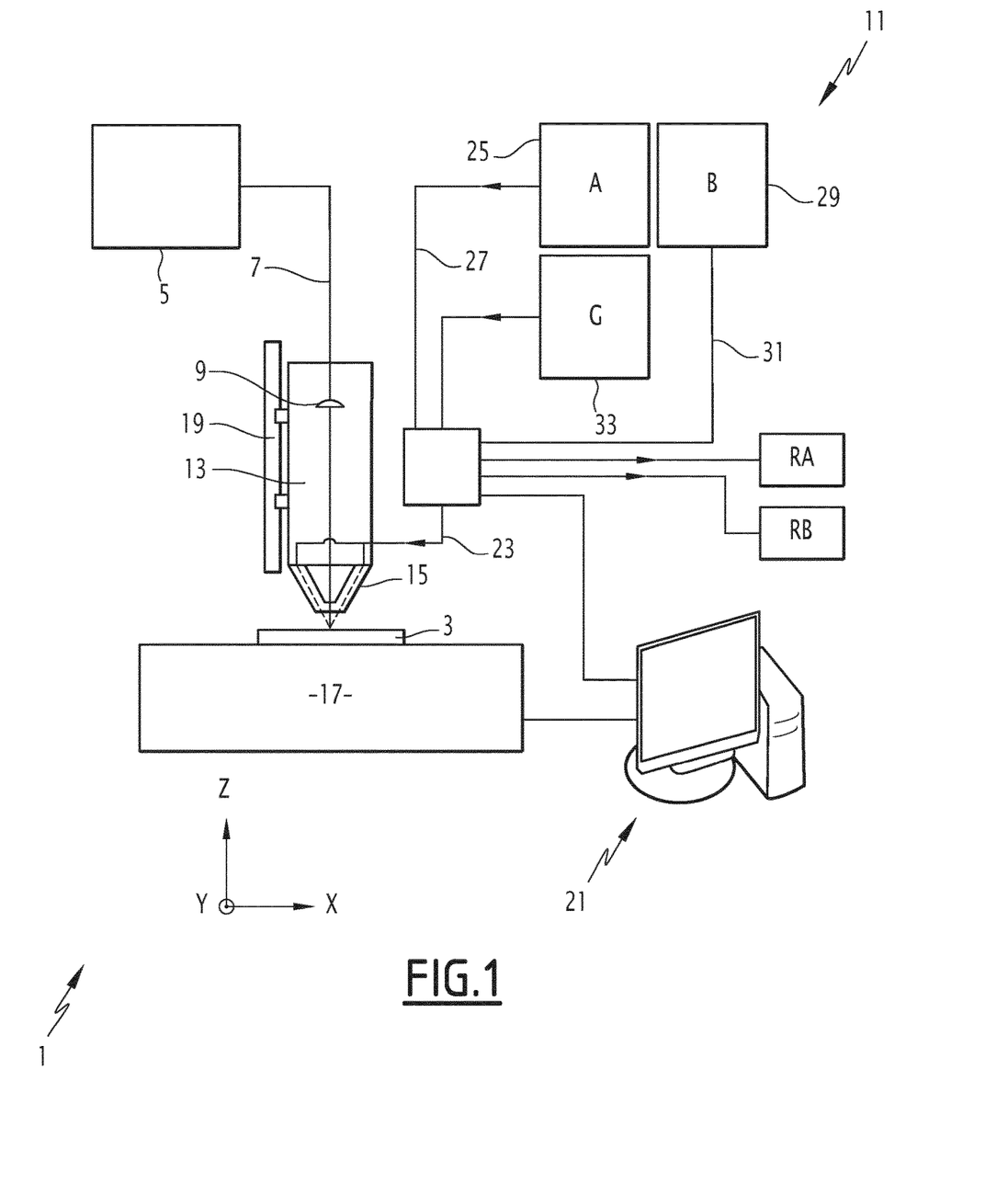
FIG. 1 is a diagrammatic representation of a 3D printer according to the invention.

As can be seen in FIG. 1, the laser source 5 produces a laser beam 7 that is focussed by the focusing system 9 onto the object 3 being manufactured.

Concomitantly, the device 11 produces the flow 23 of powders and of carrier gas at the given volume flow rate V0. This flow 23 is sprayed via the nozzle 15 onto the object 3. This deposits on the object 3 the powders A and B, which the laser beam 7 causes to melt.

The control system 21 controls the machine base 17 to move in translation along the axes X, Y and the actuator 19 to move the printhead 13 in translation along the axis Z to deposit the powders A and B at the required locations.

FIG. 3 illustrates the preparation of the flow 23 of powders and of carrier gas.

The first source 25 produces the first flow 27 at a volume flow rate equal to the given volume flow rate V0. The first flow 27 takes the line A1 and enters into the first proportional valve 59 via the inlet 61. The first proportional valve 59 divides the first flow 27 into two fractions. A first fraction, corresponding to the percentage X1, is sent via the first outlet 63 and takes the line A2 to the outlet junction 49. The other fraction, corresponding to the volume percentage 100−X1, is sent via the second outlet 65 and takes the line A3 to the first recycling junction 51.

In an analogous manner, the second source 29 produces the second flow 31 at a volume flow rate equal to the given volume flow rate V0. The second flow 31 takes the line B1 and arrives at the inlet 69 of the second proportional valve 67. The second proportional valve 67 divides the second flow 31 into two fractions. One of those fractions, corresponding to the volume percentage X2, leaves via the first outlet 71, takes the line B2, and arrives at the outlet junction 49. The other fraction, corresponding to the volume percentage 100−X2, is sent via the second outlet 73 and takes the line B3 to the second recycling junction 55.

The carrier gas source 33 produces the adjustment carrier gas flow 35, also at a volume flow rate V0. A connecting volume percentage Z of the adjustment carrier gas flow 35 takes the first connecting line G0 to the inlet 77 of the adjustment proportional valve 75. The remaining fraction, corresponding to a volume percentage 100−Z, takes the second connecting line G4 and passes through the regulator member 47 to the outlet junction 49. The fraction of the adjustment carrier gas flow 35 entering the adjustment proportional valve 75 is itself divided into two fractions. A first fraction, corresponding to the volume percentage Y, is sent via the first outlet 79 and reaches the first recycling junction 51 via the line G3. The other fraction, corresponding to a volume percentage 100−Y is sent via the second outlet 81 and reaches the second recycling junction 55 via the line G5.

The fraction of the first flow 27 taking the line A2, the fraction of the second flow 31 taking the line B2 and where applicable the fraction of the carrier gas taking the line G4 are mixed in the outlet junction 49 to form the flow 23 of powders and of carrier gas. A mixer member 99 (FIG. 2) is optionally added between the outlet junction 49 and the nozzle 15 to improve the homogeneity of the flow 23.

The control system 21 continuously adjusts the volume percentage X1, the volume percentage X2 and where applicable the adjustment member 47 determining the volume percentage 100−Z so that the flow 23 of powders and of carrier gas has a volume flow rate substantially equal to the given volume flow rate V0. The volume flow rate of the flow 23 being fixed, and the head losses downstream of the outlet junction 49 therefore being substantially constant, this determines the pressure P0 in the outlet junction 49.

The fraction 37 of the first flow 27 taking the line A3 and the carrier gas fraction taking the line G3 are mixed in the first recycling junction 51 to form a flow 101 that enters into the first recycling system RA via the inlet 53. The first recycling system RA recovers at least a fraction of the powder A present in the flow 101 and sends a residual flow 103 to the aspiration and filtration system 41. The powder A recovered in this way is advantageously used in the 3D printer 1 or in another one.

The control system 21 controls the adjustment proportional valve 75 so that the volume percentage Y is such that the flow 101 has a volume flow rate substantially equal to the volume flow rate V0. Moreover, the control system 21 controls the regulator member 43 so that the pressure PA in the first recycling junction 51 is substantially equal to the pressure P0 of the outlet junction 49. Accordingly, the first proportional valve 59 is connected downstream of the outlet junction 49 and to the first recycling junction 51, which are both at the same pressure.

In an analogous manner, the fraction of the second flow 31 taking the line B3 and the fraction of the carrier gas G taking the line G5 are mixed in the second recycling junction 55 to form a flow 105 entering into the second recycling system RB via the inlet 57. The second recycling system RB recovers at least a fraction of the powder B present in the flow 105 and sends a residual flow 107 to the aspiration and filtration system 41.

The control system 21 controls the second proportional valve 67 and the adjustment proportional valve 75 so that the flow 105 has a volume flow rate substantially equal to the volume flow rate V0. Moreover, the control system 21 controls the regulator member 45 so that the pressure PB in the second recycling junction 55 is substantially equal to the pressure P0. The second proportional valve 67 and the adjustment proportional valve 75 are therefore connected, downstream, to junctions at substantially the same pressure.

Accordingly, the adjustments of the first proportional valve 59 and of the second proportional valve 67 are, in the most general case, independent of one another and it is therefore possible to choose the quantity of powder A and the quantity of powder B in the flow 23 by choosing the volume percentages X1 and X2 independently of one another. The regulator member 47 is controlled to feed to the outlet junction 49 a complementary quantity of carrier gas necessary for the flow 23 to have a volume flow rate that is always equal to the given volume flow rate V0.

This enables modulation of the proportion of the powders A and B in the flow 23, as well as their total quantity.

According to a slightly simpler mode of operation, the flow of carrier gas taking the second connecting line G4 is fixed, for example by closing the adjuster member 47 completely. Under these conditions the first proportional valve 59 and the second proportional valve 67 are controlled in a synchronous manner and the proportion of the powders A and B in the flow 23 is modified, but not the total quantity of powders in that flow. In this mode of operation it is possible to connect mechanically the switches 93 of the first proportional valve 59, the second proportional valve 67 and where applicable the third proportional valve 75 thanks to the configuration shown in FIG. 5.

When the regulator member 47 is completely closed, then the following relation applies: X1+X2=100%. By way of example, the first proportional valve 59 is adjusted to send 33% of the first flow 27 of powder A to the nozzle 15 and 67% to the first recycling system RA. The switch 93 of the second proportional valve 67 is then adjusted to send 67% of the second flow 31 to the nozzle 15 and 33% to the second recycling system RB. Then X1=33% and X2=67%, with X1+X2=100%.

The adjustment proportional valve 75 for example distributes a volume percentage Y of 33% of the adjustment carrier gas flow 35 in the line G3 and a volume percentage 1−Y of 67% of the adjustment carrier gas flow in the line G5. The flow rates and the pressures at the outlet of the points 51 and 55 are therefore substantially identical to the flow rate V0 and to the outlet pressure P0 of the point 49.

According to one particular embodiment that is not shown, the device 11 does not include the second connecting line G4 or the regulator member 47, which amounts in the first embodiment described hereinabove to closing the regulator member 47 completely.

As will have been understood, in all cases the adjustments of the proportional valves do not destabilize the pressures PA, PB and P0 because the volume flow rates remain constant downstream of the outlet junction 49 of the first recycling junction 51 and of the second recycling junction 55. The device 11 therefore remains in pressure equilibrium.

Blocking of the lines by deposits of powder is prevented by maintaining a constant volume flow rate in the first recycling system RA and in the second recycling system RB.

Thanks to the optional second connecting line G4 and to the adjustment member 47 it is moreover possible to modulate the total quantity of powders A and B.

The possibility of rapidly shutting off the flow of powder enables a saving of 20 to 40% of the quantity of powder sprayed.

Thanks to the above features, it is possible to meter the powders A and B with a very short response time.

This moreover enables stopping of the spraying of powder between two movements of the object 3 with no laser firing. It suffices for X1=0% and X2=0%.

It is equally possible to change the type of powder virtually instantaneously, for example by changing from X1=100% and X2=0% to X1=0% and X2=100%, by synchronizing the proportional valves.

It is therefore possible to produce parts with graded properties by modulating the quantity of the powders A and B according to the location in the object 3.

The relation X1+X2=100% is advantageously obtained by mechanically connecting the switches 93 of the first proportional valve 59 and of the second proportional valve 67.

The proportional valves 59, 67, 75 and the adjustment members 47, 43 and 45 are advantageously numerically controlled.

Figure 6:
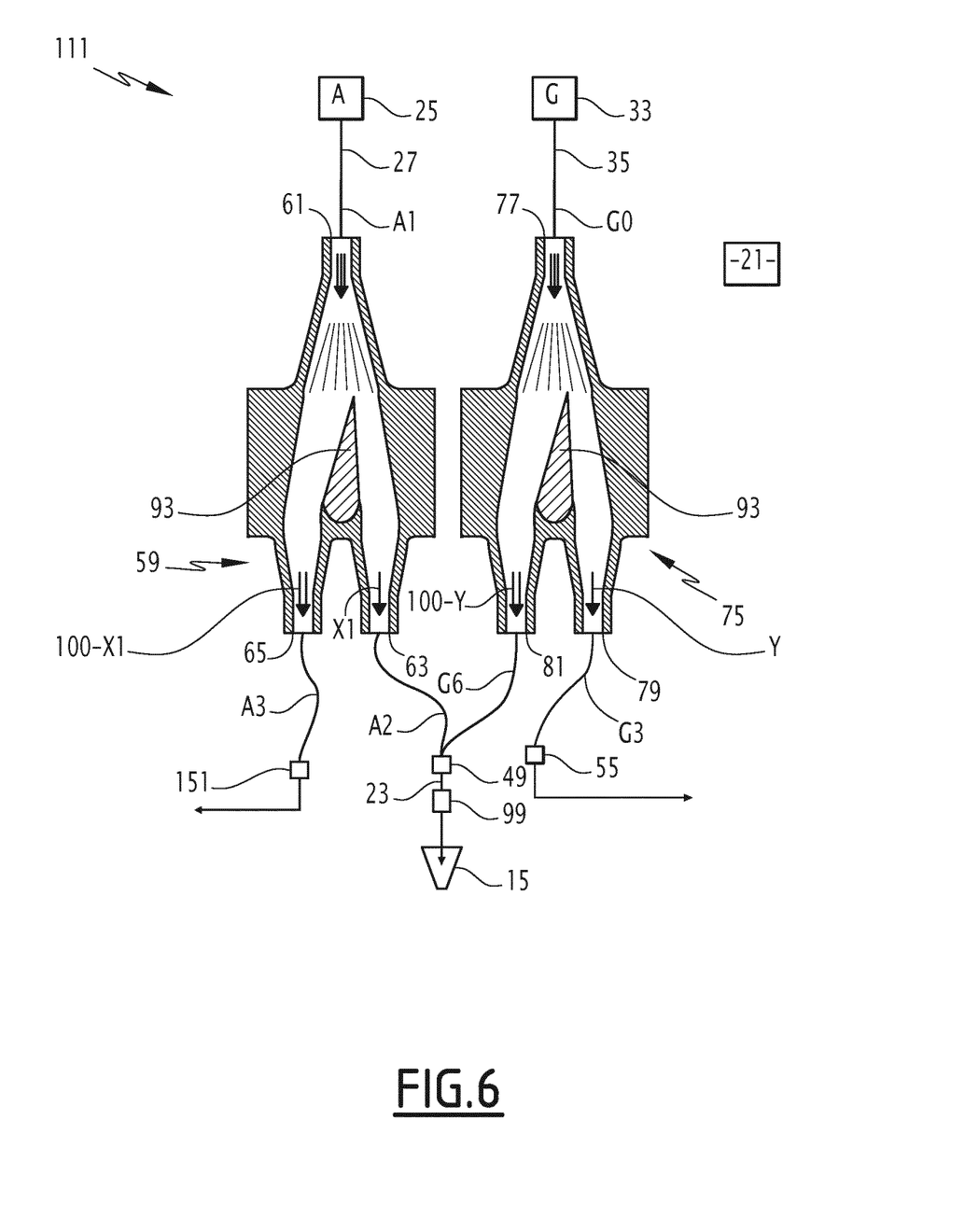
FIG. 6 is a diagrammatic representation of a metering device according to a second embodiment of the invention, for producing a flow of only one powder.

A device 111 constituting a second embodiment of the invention will now be described with reference to FIG. 6. The device 111 is analogous to the device 11 represented in FIGS. 1 to 3. Similar elements bear the same reference numbers and will not be described again. Only the differences will be described in detail hereinafter.

The device 111 does not include the second source 29 of powder B. In this example the system 111 does not include either the system RB for recycling the powder B.

The outlet junction 49 is still connected by the line A2 to the first outlet 63 of the first proportional valve 59 and is equally connected by a line G6 to the second outlet 81 of the adjustment proportional valve 75.

The second outlet 65 of the first proportional valve 59 is connected to an outlet 151 for evacuating the fraction of the flow 27 corresponding to the volume percentage 100−X1. Similarly, the first outlet 79 of the adjustment proportional valve 75 is connected by the line G3 to an outlet 155 for evacuating the fraction of the adjustment carrier gas flow 35 corresponding to the volume percentage Y.

The control system 21 controls the first proportional valve 59 and the adjustment proportional valve 75 so that the volume flow rate of the flow 23 is substantially equal to the given volume flow rate V0. In the present instance, this is obtained by adjusting the two proportional valves in such a manner that the percentages X1 and Y are substantially equal to one another.

It is then possible to couple mechanically the switches 93 of the first proportional valve 59 and of the adjustment proportional valve 75, for example by rendering them coaxial as represented in FIG. 5.

Thanks to the features described hereinabove, the device 111 enables modulation of the quantity of powder A in the flow 23.

The invention claimed is:

1. A device for metering one or more powders in order to produce a flow of the one or more powders and of a carrier gas at a given volume flow rate, the device comprising:
    at least a first source adapted to supply a first flow including a first powder and a first carrier gas at a volume flow rate substantially equal to the given volume flow rate;
    a source of a carrier gas adapted to supply an adjustment carrier gas flow at a volume flow rate substantially equal to the given volume flow rate;
    an outlet junction for sending the flow of the one or more powders and of carrier gas;
    at least a first proportional valve including an inlet connected to the first source to receive the first flow, a first outlet for selectively sending a volume percentage X1 of the first flow to the outlet junction, and a second outlet adapted to send a volume percentage 100−X1 of the first flow, the percentage X1 being between 0% and 100% inclusive and representative of a setting of the first proportional valve;
    an adjustment proportional valve including an inlet connected to the source of the carrier gas by a first connecting line to receive at least a fraction of the adjustment carrier gas flow, a first outlet adapted to send a volume percentage Y of the fraction, and a second outlet adapted to send a volume percentage 100−Y of the fraction, the percentage Y being between 0% and 100% inclusive and representative of a setting of the adjustment proportional valve;
    a control system adapted to control at least the first proportional valve and the adjustment proportional valve and configured so that the flow of the one or more powders and of carrier gas has a volume flow rate substantially equal to the given volume flow rate;
    at least a first recycling system for recycling at least a part of the first flow;
    at least a first recycling junction connected, upstream, to the second outlet of the first proportional valve to receive the percentage 100−X1 of the first flow and to the first outlet of the adjustment proportional valve to receive the percentage Y of the fraction and, downstream, to an inlet of the first recycling system, the control system being configured so that the inlet of the first recycling system receives a volume flow rate substantially equal to the given volume flow rate; and
    an aspiration and filtration system connected to an outlet of the first recycling system and a member for regulating a head loss between the first recycling system and the aspiration and filtration system, the member being adapted so that a pressure in the outlet junction and a pressure in the first recycling junction are substantially equal to one another.

2. The device according to claim 1, wherein the first proportional valve and the adjustment proportional valve each include an internal diffuser and a switch mobile in rotation relative to the diffuser, respectively to divide:
    the first flow into the percentage X1 and the percentage 100−X1, and
    the fraction of the adjustment carrier gas flow into the percentage Y and the percentage 100−Y.

3. The device according to claim 1, wherein the outlet junction is connected to the second outlet of the adjustment proportional valve to receive the volume percentage 100−Y of the fraction, the device being configured so that the percentage X1 and the percentage Y are substantially equal to one another and the fraction is equal to 100%.

4. The device according to claim 1 further comprising:
a second source adapted to supply a second flow including a second powder distinct from the first powder and a carrier gas at a volume flow rate substantially equal to the given volume flow rate; and
a second proportional valve including an inlet connected to the second source to receive the second flow, a first outlet adapted selectively to send a volume percentage X2 of the second flow to the outlet junction and a second outlet adapted to send a volume percentage 100−X2 of the second flow, the percentage X2 being between 0% and 100% inclusive and representative of a setting of the second proportional valve, the control system being further adapted to control the second proportional valve.

5. The device according to claim 4 further comprising:
a second recycling system for recycling at least a part of the second stream; and
a second recycling junction connected, upstream, to the second outlet of the second proportional valve to receive the percentage 100−X2 of the second flow and to the second outlet of the proportional adjustment valve to receive the proportion Y of the fraction and, downstream, to an inlet of the second recycling system, the control system being configured so that the inlet of the second recycling system receives a volume flow rate substantially equal to the given volume flow rate.

6. The device according to claim 5, wherein the control system is configured so that the percentage Y is substantially equal to the sum of the percentages X1 and X2 and the fraction is equal to 100%.

7. The device according to claim 1 further comprising a second line connecting the first connecting line to the outlet junction to deliver to the outlet junction a fraction of the adjustment carrier gas flow.

8. A 3D printer spraying one or more powders including:
a device according to claim 1; and
at least one nozzle for ejecting the flow of the one or more powders and vector gas.

* * * * *